(12) United States Patent
Zygmanski et al.

(10) Patent No.: US 10,031,244 B2
(45) Date of Patent: Jul. 24, 2018

(54) DETECTORS, SYSTEM AND METHOD FOR DETECTING IONIZING RADIATION USING HIGH ENERGY CURRENT

(71) Applicants: The Brigham and Women's Hospital, Inc., Boston, MA (US); University of Massachusetts, Boston, MA (US)

(72) Inventors: Piotr Zygmanski, West Roxbury, MA (US); Erno Sajo, Windham, NH (US)

(73) Assignees: University of Massachusetts, Boston, MA (US); The Brigham and Women's Hospital, Inc., Boston, MA (US)

( * ) Notice: Subject to any disclaimer, the term of this patent is extended or adjusted under 35 U.S.C. 154(b) by 0 days.

(21) Appl. No.: 15/313,248

(22) PCT Filed: May 26, 2015

(86) PCT No.: PCT/US2015/032393
§ 371 (c)(1),
(2) Date: Nov. 22, 2016

(87) PCT Pub. No.: WO2015/179858
PCT Pub. Date: Nov. 26, 2015

(65) Prior Publication Data
US 2017/0184730 A1 Jun. 29, 2017

Related U.S. Application Data

(60) Provisional application No. 62/002,415, filed on May 23, 2014, provisional application No. 62/002,425, filed on May 23, 2014.

(51) Int. Cl.
*G01T 1/20* (2006.01)
*G01T 1/208* (2006.01)
*G01T 1/185* (2006.01)

(52) U.S. Cl.
CPC .............. *G01T 1/208* (2013.01); *G01T 1/185* (2013.01)

(58) Field of Classification Search
CPC .. G01T 1/185; G01T 1/18; G01T 3/00; G01T 1/2955; G01T 1/28
See application file for complete search history.

(56) References Cited

U.S. PATENT DOCUMENTS 3,393,315 A     7/1968  Locker et al.
4,123,658 A *  10/1978  Johansson ............... G01T 3/006
                                                              250/390.01

(Continued)

FOREIGN PATENT DOCUMENTS

GB              1082144 A  *  9/1967  ............ H01J 47/02

OTHER PUBLICATIONS

Notification of Transmittal of the International Search Report and the Written Opinion of the International Searching Authority for PCT/US2015/032393, "Detectors, System and Method for Detecting Ionizing Radiation Using High Energy Current", dated Aug. 21, 2015.

(Continued)

*Primary Examiner* — Kiho Kim
(74) *Attorney, Agent, or Firm* — Chapin IP Law, LLC

(57) ABSTRACT

Detectors, a system and a method for detecting ionizing radiation are provided. In some aspects, a detector includes a first layer comprising a first conducting material, and a second layer comprising a second conducting material, wherein at least one of the first layer and second layer is configured to produce secondary particles upon irradiation by an ionizing radiation. The detector also includes a separating layer positioned between the first and second layer configured to transport therebetween at least one of charges associated with the secondary particles and charges pro- (Continued)

duced by the secondary particles, wherein an electric current generated by the charges, and collected between the first and second layer, is indicative of properties the ionizing radiation.

21 Claims, 14 Drawing Sheets

(56) References Cited

U.S. PATENT DOCUMENTS

| | | | | |
|---|---|---|---|---|
| 4,140,910 A | * | 2/1979 | Kroon | G01T 3/006 250/390.01 |
| 4,237,380 A | * | 12/1980 | Playfoot | G01T 3/006 250/370.04 |
| 4,238,676 A | * | 12/1980 | Goldstein | G01T 3/006 250/370.04 |
| 4,284,893 A | * | 8/1981 | Allan | G01T 3/006 250/390.01 |
| 4,389,570 A | * | 6/1983 | Goldstein | G01T 3/006 250/370.04 |
| 4,434,370 A | * | 2/1984 | Goldstein | G01T 3/006 250/370.04 |
| 5,251,242 A | * | 10/1993 | Impink, Jr. | G01T 3/006 376/154 |
| 5,256,878 A | * | 10/1993 | Levert | G01T 1/24 250/370.04 |
| 5,973,328 A | * | 10/1999 | Hiller | G01T 3/00 250/361 R |
| 6,727,503 B1 | | 4/2004 | Gerstenmayer | |
| 7,589,327 B2 | | 9/2009 | Kerwin | |
| 2006/0054863 A1 | | 3/2006 | Dai et al. | |
| 2009/0179155 A1 | | 7/2009 | Weinberg | |
| 2014/0110578 A1 | * | 4/2014 | Takeuchi | G01T 3/006 250/336.1 |

OTHER PUBLICATIONS

Zygmanski, P. and Sajo, E., "A Self-Powered Thin-Film Radiation Detector Using Intrinsic High-Energy Current", Medical Physics, 43(1):4-15 (2016).

Zygmanski, P., et al., "Dosimetric Properties of High Energy Current (HEC) Detector in keV X-Ray Beams", Physics in Medicine & Biology, 60:N121-N129 (2015).

Zygmanski, P., et al., "Prototypes of Self-Powered Radiation Detectors Employing Intrinsic High-Energy Current", Medical Physics, 43(1):16-22 (2016).

Brivio, D., et al. "Towards Thin-Film Self-Powered Radiation Detectors Employing Disparate Conductive Layers", Journal of Physics D: Applied Physics, 48:7 pages (2015).

Extended European Search Report, application No. 15 796 444.6, dated Jan. 3, 2018, pp. 10.

* cited by examiner

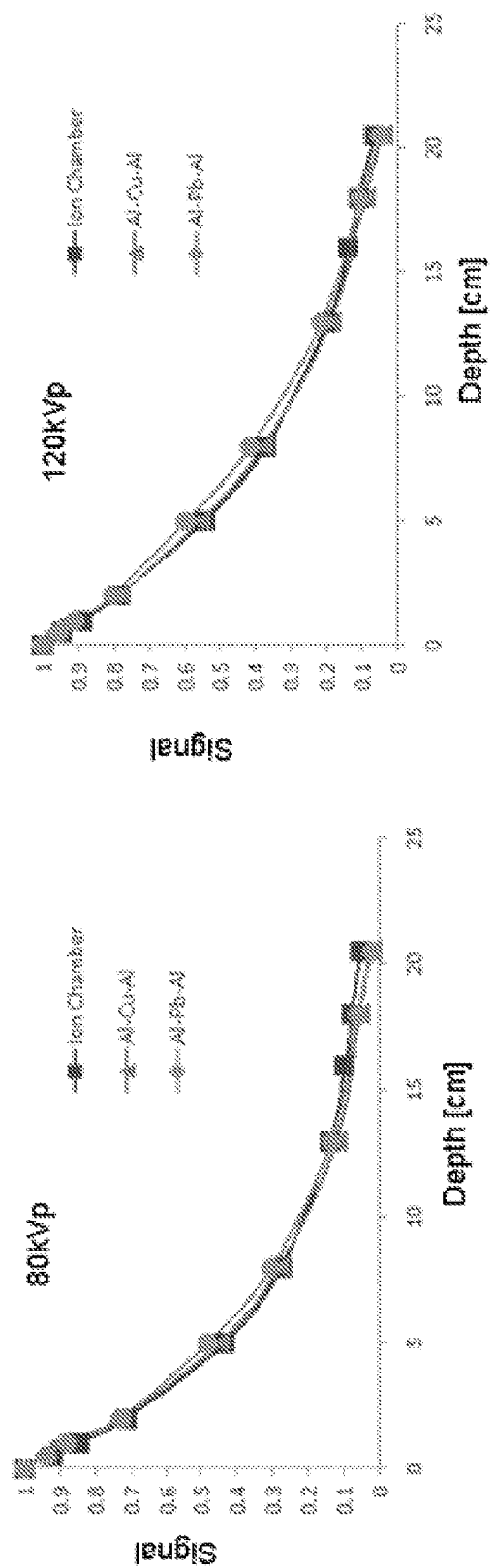

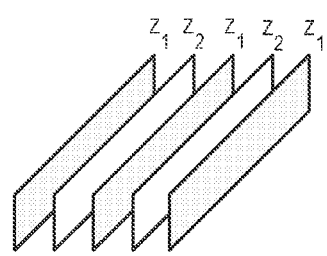
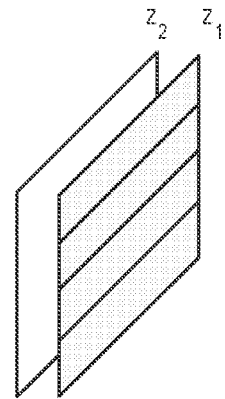
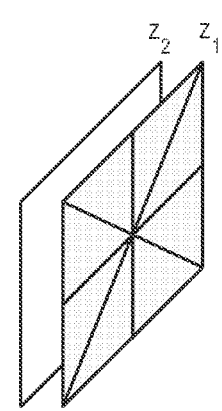
FIG. 10A                FIG. 10B                FIG. 10C
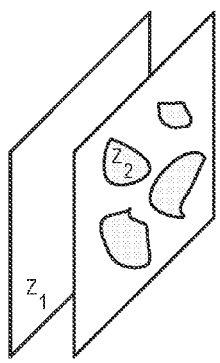
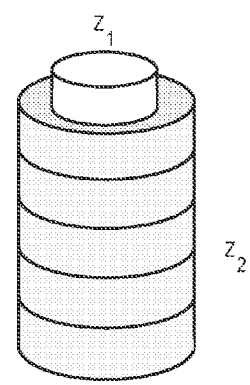
FIG. 10D                FIG. 10E
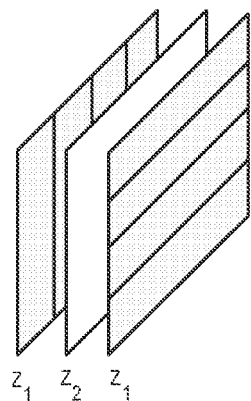
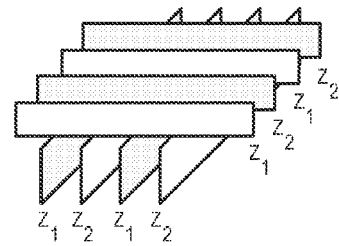
FIG. 10F                FIG. 10G

DETECTORS, SYSTEM AND METHOD FOR DETECTING IONIZING RADIATION USING HIGH ENERGY CURRENT

CROSS-REFERENCE TO RELATED APPLICATIONS

This application is the U.S. National Stage Application of International Application No.: PCT/US2015/032393, filed on May 26, 2015, entitled "DETECTORS, SYSTEM AND METHOD FOR DETECTING IONIZING RADIATION USING HIGH ENERGY CURRENT, which claims the benefit of, and incorporates in their entirety, U.S. Provisional Patent Application Ser. No. 62/002,415, filed on May 23, 2014, and entitled "NANO-DETECTION METHODS FOR HIGH SENSITIVITY MEDICAL IMAGING," and U.S. Provisional Patent Application Ser. No. 62/002,425, filed on May 23, 2014, and entitled "EFFICIENT IONIZING RADIATION DEVICES FOR MEDICAL IMAGING, RADIOTHERAPY AND RADIATION PROTECTION EMPLOYING HIGH ENERGY CURRENT (HEC)."

BACKGROUND

The field of the invention relates to systems, methods and devices for detecting ionizing radiation. In particular, the present disclosure is directed to systems, methods and devices for efficient detection of ionizing radiation using measures of high energy and/or low energy charge carriers generated therefrom.

The need for detection and quantification of ionizing radiation, such as x-rays, γ photons and neutrons, is pervasive in many areas of technology, including national security, radiological response, and defense applications, as well as medical imaging, radiotherapy treatment, and radiation protection applications. The modern paradigm of radiation detection development has been to increase detector efficiency by improving the utilization of the incident ionizing radiation entering a detector volume, and enhanced signal processing. This has lead to increased sophistication of the hardware and software associated with the detectors, as well as in the energy conversion methods associated with the active regions of the detectors. For instance, in order to stop more particles and increase efficiency, many modern radiation detectors have required relatively large active volumes and mass, increasing cost and system bulk. In addition, such detectors generally implement high-voltage sources to collect or accelerate charge carriers, and require various signal amplification techniques. They are also susceptible to aging and tend to be sensitive to environmental conditions, such as temperature and humidity, including mechanical, thermal, and electrostatic shocks. In addition, because the active sensors in common radiation detectors can be up the order of a few inches in diameter and length, the solid angle, or, the angle viewed from the radiation source subtended by the detector area, is small. This means that it possible to detect only a fraction of the radiation emitted from the radiation source, adding a geometric constraint to the detector efficiency.

Previous technologies have utilized either indirect or quasi-direct methods for detecting ionizing radiation. Specifically, indirect methods convert incident ionizing radiation into electric signals by first depositing the energy of the ionizing radiation into the active bulk of a detector material, producing intermediate carriers of energy therein, which are then used in the formation of a measurable electric signal. In particular, the most common method includes use of a scintillator material, which when exposed to ionizing radiation absorbs and re-emits energy in the form of optical or ultraviolet ("UV") photons. These photons are then detected using an optical or UV sensor and further amplified and processed to generate a usable electric signal.

On the other hand, the most common quasi-direct method for detecting ionizing radiation includes applying an external electric potential between two electrodes in a gas-filled chamber. Incident ionizing radiation generates ion pairs in the gas, which under the influence of the external electric potential are transported as positive and negative charges towards respective cathode and anodes, thus creating a measurable pulse or continuous current. In other quasi-direct methods, an electric pulse or continuous current is created from electron-hole pairs generated from the interaction of ionizing radiation with a bulk semiconducting material. The electron-hole pairs are then collected by externally charged electrodes.

Many present detector technologies are limiting and can demand large capital expenditure. Specifically, present day detector conversion of ionizing radiation via multiple mechanisms implies loss of efficiency, requiring higher complexity and detector bulk associated with increased cost of production and operation. For instance, in many field applications, such as portal monitoring, it is expensive to deploy, maintain and replace such detectors. In addition, limitations on detector capabilities can prevent miniaturization or decrease the power consumption. As an example, in hand-held devices, many detector types must be ruggedized to avoid damage, increasing their bulk and weight, thus limiting maneuverability and the agility of an operator in the field. In addition, owing to their specialized technology, such detectors cannot be easily modified and adapted to new conditions, including incorporation into new equipment or personal gear.

Given the above, there is a need for new systems and methods for detecting ionizing radiation. In particular, there is a need for detecting ionizing radiation in ways that are cost effective, allow scaling to large areas, are amenable to tight spaces, can conform to various geometrical shapes, and further need not rely on external power to generate measurable signals.

SUMMARY

The present disclosure provides detectors, a system and method that overcome the aforementioned drawbacks by introducing a novel approach for detecting ionizing radiation. In particular, the present disclosure provides detectors, a system and method implementing a scalable detector structure, which allows for a number of advantages compared to previous detector technologies, including greater flexibility, simplified production and operation and reduced cost. In fact, as will become apparent from descriptions herein, the present approach represents a paradigm shift from the conventional detection methods, which are increasingly relying on added complexity and bulkier detector systems in order to achieve enhanced efficiency.

By contrast, detector embodiments detailed in the present disclosure include a remarkably simple structure comprising layers of micrometer and nanometer dimensions, and utilizes measures of charged particle current not explored previously for detecting ionizing radiation. In particular, as will be described, detectors in accordance with aspects present disclosure need not rely on external power sources or amplification to generate measurable electric signals.

In one aspect of the disclosure, a detector for detecting ionizing radiation is provided. The detector includes a first layer comprising a first conducting material, and a second layer comprising a second conducting material, wherein at least one of the first layer and second layer is configured to produce secondary particles upon irradiation by an ionizing radiation. The detector also includes a separating layer positioned between the first and second layer configured to transport therebetween at least one of charges associated with the secondary particles and charges produced by the secondary particles, wherein an electric current generated by the charges, and collected between the first and second layer, is indicative of properties the ionizing radiation.

In another aspect of the disclosure, a system for detecting ionizing radiation is provided. The system includes at least one source of ionizing radiation, and at least one detector. The at least one detector includes a first layer comprising a first conducting material, and a second layer comprising a second conducting material, wherein at least one of the first layer and second layer are configured to produce a plurality of high energy charged particles upon irradiation by ionizing radiation from the at least one source. The at least one detector also includes a separating layer positioned between the first layer and second layer. The system also includes a detector circuit electrically connected to the at least one detector and configured to measure an electric current between the first layer and second layer generated by at least one of the high energy charged particles and charges released in the separating layer by high energy charged particles.

In yet another aspect of the disclosure, a method for detecting ionizing radiation is provided. The method includes positioning at least one detector relative to an ionizing radiation beam. The at least one detector includes a first layer comprising a first conducting material, and second layer comprising a second conducting material, wherein at least one of the first layer and second layer are configured to produce a plurality of high energy particles upon irradiation by an ionizing radiation. The at least one detector also includes a separating layer positioned between the first layer and second layer configured to transport charges therebetween. The method also includes measuring an electric current between the first layer and second layer, wherein the electric current is indicative of properties of the ionizing radiation and is generated by at least one of charges associated with the high energy particles and charges produced by the high energy particles.

The foregoing and other aspects and advantages of the invention will appear from the following description. In the description, reference is made to the accompanying drawings that form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF THE DRAWINGS

FIG. 5A is a graphical example showing water-equivalent depth performance comparison between a standard ion chamber and detectors, as shown in FIG. 4A, upon exposure to 80 kVp x-rays.

FIG. 5B is another graphical example showing water-equivalent depth performance comparison between a standard ion chamber and detectors, as shown in FIG. 4A, upon exposure to 120 kVp x-rays.

FIG. 10A is an example detector configuration, in accordance with aspects of the present disclosure.

FIG. 10B is another example detector configuration, in accordance with aspects of the present disclosure.

FIG. 10C is yet another example detector configuration, in accordance with aspects of the present disclosure.

FIG. 10D is yet another example detector configuration, in accordance with aspects of the present disclosure.

FIG. 10E is yet another example detector configuration, in accordance with aspects of the present disclosure.

FIG. 10F is yet another example detector configuration, in accordance with aspects of the present disclosure.

FIG. 10G is yet another example detector configuration, in accordance with aspects of the present disclosure.

DETAILED DESCRIPTION

Figure 1B:
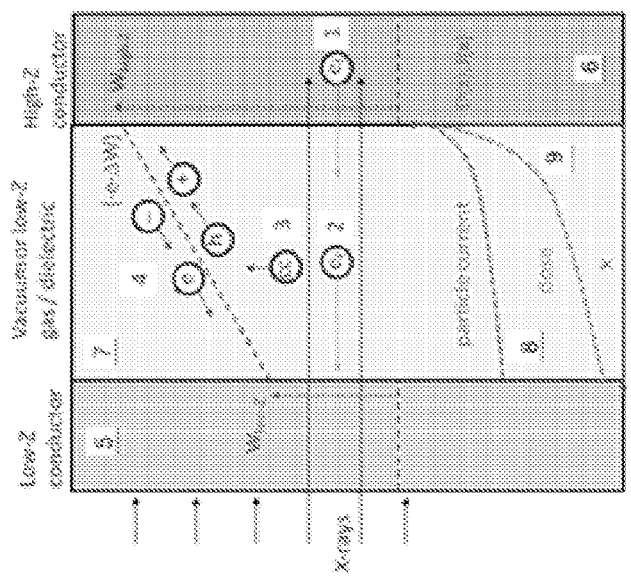
FIG. 1B is cross-sectional view of the example detector of FIG. 1A illustrating an example of high energy current and dose enhancement, in accordance with aspects of the present disclosure.

The present disclosure is directed to systems and methods for detecting ionizing radiation based on a novel detector structure. Previous development of ionizing radiation detectors has been focused on increasing active material bulk to absorb more ionizing radiation, thereby increasing detector efficiency. By contrast, in the present disclosure it is recognized that with advent of progress of thin film manufacturing technology there is an opportunity for exploiting physical phenomena at the micrometer and nanometer length scales for purposes of ionizing radiation detection. Given that physical and operating principles of sensors at such scales are substantially different from those of conventional technologies, the present disclosure introduces a scalable thin film structure for detecting ionizing radiation, which by its construction, affords various capabilities and applications not contemplated or possible with previous detection methods.

Among other advantages, the provided detector structures includes the ability to directly generate measurable electric signals without need for external power sources or amplification, and is not limited due to response saturation. In addition, the present detector structure may be configured to conform to various geometric shapes in one, two, or three dimensions, and possess properties that allow operational stability in harsh environments. While in some implementations the present detector can be nearly transparent to the incident radiation, other configurations may allow for increased radiation stopping power, or energy deposition per unit path-length. Additional features and benefits may be readily apparent to one or ordinary skill in the art from descriptions provided below.

The present approach is applicable to a variety of applications, such as medical, industrial, radiation safety, radiation monitoring, and research applications, and can provide measurement of ionizing radiation dose, intensity, timing, energy spectrum, as well as determine a location and direction of the incident radiation. In addition, the present approach may be utilized for photon or particle counting, enhancement and filtration of radiation, and so forth.

As used herein, and unless specified otherwise, "ionizing radiation" and similar such terms are used in the broad sense and includes, but is not limited to, x-rays, gamma-rays, protons, positrons, electrons, neutrons, heavy ions, alpha particles, beta particles, and other subatomic particles.

As also used herein, unless specified otherwise, the term "conductor" or "conducting material" refers to materials that are electrically conductive or semiconducting either under normal conditions and/or during irradiation.

Yet also used herein, unless specified otherwise, the terms "high-Z," "medium-Z" and "low-Z" refer to the relative magnitudes of the effective atomic numbers of materials utilized in accordance with the present disclosure, including conductors, dielectrics, semiconductors and scintillators, and others.

Yet also used herein, unless specified otherwise, the term "secondary particles" refers to those particles, charged or uncharged, that are set in motion by interactions with a primary ionizing radiation beam(s) via photoelectric effect, Compton scattering, Auger effect, and pair production, electron or other charged particle knock-on reactions, elastic and inelastic scattering reactions by charged and neutral particles, and nuclear reactions or combinations thereof.

Yet also used herein, unless specified otherwise, the term "high energy current," refers to an electric current, generated by exposure to ionizing radiation, between at least two conductors, of similar or different properties, that are separated by a separating layer. In particular, the electric current is produced by high energy secondary charged particles released in the first conducting material that possess sufficient kinetic energy to traverse the separating layer to reach the second conductor, without the benefit of applied electric fields.

Yet also used herein, unless specified otherwise, the term "dose enhancement," refers to the specific energy deposited by secondary particles either in the bulk of a material, or proximate to an interface separating two or more materials or material layers.

Yet also used herein, unless specified otherwise, the term "thin film" refers to a layer of uniform material or layers or a structure including several materials that possess at least a thickness in the range of nanometer to sub-millimeter.

Figure 1A:
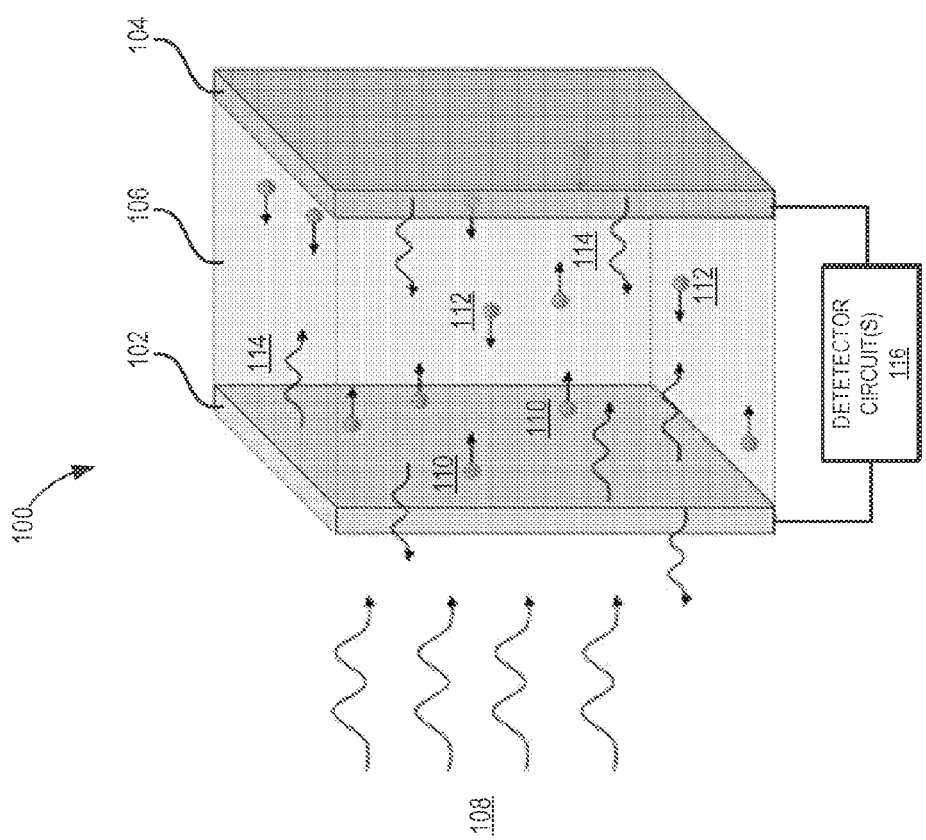
FIG. 1A is a perspective view of an example ionizing radiation detector, in accordance with aspects of the present disclosure.

Referring particularly to FIG. 1A, a schematic diagram of an example ionizing radiation detector 100, in accordance with aspects of the present disclosure, is shown. As shown, the detector 100 includes a first layer 102, a second layer 104, and a separating layer 106 or gap positioned between the first layer 102 and second layer 104.

As will be described, the first layer 102 and/or second layer 102 may preferably include materials configured to produce a plurality of secondary charged particles upon irradiation by a primary ionizing radiation beam 108. Although the primary ionizing radiation beam 108 is shown FIG. 1A to be perpendicular to proximal surface of the first layer 102, it is possible the incidence of the beam may be at an angle relative to a surface normal of the first layer 102 or the second layer 104. In addition, in some aspects, the separating layer 104 may also include materials configured to generate secondary charged particles. Such secondary charged particles may be generated either by interactions of material elements or structures in the separating layer 104 with the primary ionizing radiation beam 108, or interactions of material elements or structures in the separating layer 104 with secondary particles produced from the primary ionizing radiation beam 108, or both. In this manner, an electric current indicative of incoming ionizing radiation can generated and directly measured using various techniques available, without need for external power sources or amplification.

As shown in FIG. 1A, interactions of the ionizing radiation beam 108 with materials in the first layer 102 and the second layer 104 give rise to forward moving high energy charged particles 110, forming a forward high energy current ("HEC"), and reverse moving charged particles 112, forming a reverse HEC, as shown in FIG. 1A. Hence, in accordance with aspects of the present disclosure, the difference between the forward HEC and reverse HEC, forming a net HEC, provides an electric current indicative of the incident radiation, and is directly measurable using one or more detector circuits 116. In some aspects, the magnitude and direction of net HEC may be controlled by particular configurations of the first layer 102 and the second layer 104, including material properties, such as atomic number, or Z-value, and radiation interaction cross-section, as well as geometrical properties, such as layer thickness, and so forth. For instance, the first layer 102 may have a high-Z value while the second layer 104 may have a medium-Z or low-Z value, or vice versa.

In some aspects, materials forming the first layer 102, the second layer 104, or both, may have conducting or semi-conducting properties. In particular, at least one of the layers includes a high-Z material or medium-Z material. By way of non-limiting example, the layers can include Al, Be, Pt, C, Au, Hg, Pb, U, W, Cs, Cd, Ag, Nb, Sn, Zn, Cu, Si, Se, Fe, Ti, Ca, K, Na, Mg, B, Ir, Th, Ta, Yb, Rh, Mo, Ru, Pd, Zr, Rb, Ga, Gd, Mn, Cr, V, Li, Mo, Hf. The layers can also include alloys, coupled layers or structures formed using the above primary materials. In addition, secondary materials, such as S, N, O, Cl, can also be present as part of different possible compounds forming the layers. For instance, the layers can include metal oxides, such as but not limited to Indium Tin Oxide, Zinc Oxide, Nickel Oxide, Iron Oxide, Copper Oxide. In other aspects, the layers can include doped materials. In further aspects, the layers can include allotrope materials, such as graphene.

As shown in FIG. 1A, the separating layer 106 is positioned between the first layer 102 and second layer 102 and is configured to allow transport therebetween of charged particles. As such, the separating layer 106 may be configured to allow the transport of charges associated with the secondary particles, or charges produced in the separating layer 106 by the secondary particles, as will be described, or both. In particular, the separating layer 106 can be uniform or structured and include materials in a gas, a liquid, or a solid state, or a combination thereof, including materials in a supercritical and superfluid state. In some aspects, the separating layer 106 includes materials that are electrically insulating or non-conductive. For instance, the separating layer 106 may include a dielectric, a semiconductor, a scintillator material, a metamaterial, a foam, a sol, a gel, and so forth. In some aspects, the separating layer 106 includes a low-Z material. In addition, the separating layer 106 can be a vacuum. In some aspects, the separating layer 106 can also include random or periodic micro-structures, nano-structures or sub-nanostructures, such as micro- or nano-particles embedded therein, to further enhance the effectiveness of the detector 100. For example, such structures may be configured with properties to generate additional high energy charged particles 110 in the separating layer 106.

By way of non-limiting example, the separating layer 106 includes solid materials such as Lithium, Boron, Berilium, Aluminum Oxide, Magnesium Alloy, Hafnium, Aluminum Nitride, BeO, CrB2, GaAs, Glass, SiO2, Si3N4, TaB2, TaC, TiC, Mg2Al4, Si5O18, InSb, BN, TiO2, WC, WSi2, ZrB2, ZrC, ZrO2, and others. In other configurations, the separating layer 106 may include gases such as air, helium, oxygen, nitrogen, carbon dioxide, Lithium Hydrogen, Ar, Kr, Ne or a combination or compounds thereof. In yet other configurations, the separating layer 106 may include compounds of organic materials, solid or gaseous, including C, H, O, N, P, S. In yet other configurations, the separating layer 106 includes materials made of or enriched in helium-3, lithium-6 or boron-10, or fissionable or fissile materials, such as U-235.

High energy charged particles 110 produced in the first layer 102 or the second layer 104 may also produce secondary charged particles in the separating layer 106 having energies much lower compared to those of HEC. Such secondary charged particles may not be capable of traversing the separating layer 106 in order to provide a measurable current between the first layer 102 and the second layer 104. Therefore, in some aspects of the present disclosure, such lower energy or slow charged particles, indicative of the incident radiation, can also be collected using judicious configuration of the layers and materials forming the detector 100. In particular, internal electric fields may be established within the separating layer 106 using an appropriate layer thickness and material properties. For instance, the first layer 102 and the second layer 104 may be configured to have different work functions, for instance, by using different materials. The difference in work functions can then be used to provide sufficient energy to transport slow-moving charges across the separating layer 106. In this manner, no externally applied electric field is required. Alternatively, or additionally, a small externally applied electric field may be applied to collect most of the slow charges generated in the separating layer 106. In some aspects, the proportion HEC and slow charge currents may be controlled using appropriate configurations, materials, and material thicknesses.

Charge currents, generated as mentioned, may then be measured in any number of ways using one or more detector circuit 116 electrically connected the first layer 102 and second layer 104, as shown in FIG. 1A. For instance, the detector circuit 116 may include current meters, voltage meters, and other elements, configured to the nature of the electric signals being measured. In some aspects, the detector circuit 116 may be configured to measure electric signals, such as currents, voltages, charges, in a pulse counting mode or an integrative mode. As described, the detector circuit 116 may also be configured to apply an external bias voltage, for example, in a range between ±1V and ±20 V, although other values may be possible. The detector circuit 116 may also be configured to detect continuous electric signals or signal pulses with a duration in a range between 1 femtosecond and 100 seconds. High-energy current gives rise to the dose enhancement of different time-scales, and hence, in some aspects, the detector circuit 116 may be configured to de-couple electric signals from pico-seconds to nano-seconds and microseconds to milliseconds during read-out.

Electric signals measured using the detector circuit 116 may then be provided to a processor or analysis system (not shown in FIG. 1A) to determine properties of the incident radiation including dose, intensity, timing, energy spectrum, count, location, and direction. In some aspects, measured electric signal converted to Radio Frequency, Microwave, Optical, and wirelessly transmitted to a reader. The signal can be also transmitted by means of an electric cable. In other aspects, electric signals measured by the detector circuit 116 may be used to power one or more connected electronic components, circuits, or devices. For instance, this can include, but is not limited to LED, OLED, LCD, phosphor sensors, and other related electric devices.

Preferably, the layers forming the detector 100, and other embodiments in accordance with the present disclosure, are configured to possess materials and geometrical properties adapted to the type and energy of the incident radiation and secondary particles produced therein. For instance, in some aspects, a thickness of first layer 102 and/or the second layer 104 may be in a range between 10 nm and 100 nm, or between 100 nm and 100 μm, or between 100 μm and 1 mm. In some aspects, it may be preferable that the layer facing the incident radiation is thinner for radiation energy below 200 keV and thicker for radiation energy above 200 keV. In some configurations, it may be preferable that the layer proximal to the incident radiation (the first layer 102 in FIG. 1A) is of a lower atomic number compared to the distal layer (the second layer 104 in FIG. 1A). That is, the material included in the first layer 102, referred to as Z1, may be a low-Z material or medium-Z material, while the material included in the second layer 104, referred to as Z2, may be a high-Z material. In other configurations, it may be preferable that the layer proximal to the incident radiation is of a higher atomic number compared to the distal layer. That is, Z1 be a high-Z material, while Z2 is a low or medium-Z material. In addition, a thickness of the separating layer 106 may be in a range between 1 nm and 5 mm, although other values may be possible, and may include a low-Z material, or a low-Z material embedded with high-Z materials. In some aspects, the thickness and material properties of the separating layer 106 may be adapted to optimize the secondary interaction density from the HEC and other primary and secondary particles. This may be desirable if seeking to measure such secondary reactions.

In some aspects, materials forming the detector 100 may be adapted to detect neutrons. For instance, in some embodiments, the separating layer 106 may be enriched in or include Li-6, B-10, He-3, or any material that can produce charged particles upon or after interacting with neutrons. In other embodiments, at least one of the first layer 102 or second layer 104 can be coated with, enriched with, or include material that interacts with neutrons to produce energetic charged particles, such as isotopes of uranium, thorium, neptunium, plutonium, americium. In yet other embodiments, at least one of the first layer 102 or second layer 104 can be coated with, enriched with, or include material that interacts with neutrons to produce gamma rays or x-rays or both. Such gamma ray or x-ray radiation may then be detected by generation of high energy charged particles, as described with reference to FIG. 1A. In this manner, the principles of detection for one type of radiation may be combined with another.

In some aspects, layers forming the detector 100 may be configured to be transparent to visible light or other radiation. In addition, the detector 100 may include materials allowing operation at temperatures between −70 Celsius or lower to 1,000 Celsius and above, although other values may be possible. In other aspects, the detector 100 may be configured to be resistant to radiation ageing, for instance, up to absorbed doses of 100 Gy, 1,000 Gy, 10,000 Gy, and above 10,000 Gy, depending on the selected materials for its components. In yet other aspects, the detector 100 may be impervious to liquids including water, bodily elements, and gases.

By way of example, FIG. 1B shows a non-limiting embodiment of the detector 100 as described with respect to FIG. 1A. In particular, a planar geometry is used and materials are adapted to the case of incident radiation that includes x-rays or gamma rays. Electrode 5 is proximal to the incident radiation and includes a conducting material having an atomic number that is lower (low-Z) than that of electrode 6 (high-Z), which also includes a conducting material. Examples of low-Z materials include Al, Ti, Cu, and Ag. Examples of high-Z materials include Cu, Ag, Pt, Au, and Pb. The separator 7 is positioned between conductors 5 and 6, and can include insulating, dielectric, or semiconducting materials. Examples include air, N, Ar, $CO_2$, as well as solid materials, such as Al2O3, and others. Since electrode 5 includes a material with lower Z-value than electrode 6, most interactions with the incident radiation will occur in electrode 6, giving rise to secondary or fast electrons 1 that leak from conductor 6.

For example, when the electrode 6 is made of gold and the incident radiation is below about 500 keV most interactions will be via photoelectric absorption, and thus the fast electrons 1 will be mostly photoelectrons and Auger electrons. When the incident radiation is above about 500 keV but below about 5 MeV most interactions will be via Compton scattering and the fast electrons 1 will be Compton electrons. When the incident radiation has energy above about 5 MeV the fast electrons 1 can be secondary electrons due to pair production and annihilation reactions. When the generated fast electrons 1 traverse the separator 7, and reach the electrode 6 they can directly induce a measurable conduction current 2, as described. While traversing the solid or gaseous separator 7 they can also generate charge carriers 3, which can include electrons, holes, positive or negative ions.

In this example, the work function of electrode 5 ($W_{low-z}$) is different from that of electrode 6 ($W_{high-z}$), hence forming a contact potential that generates an internal electric field without externally applied bias voltage. The contact potential transports the slow charge carriers 4, and permits their collection. As an example, when electrode 5 includes Al and electrode 6 include Cu, or when electrode 5 includes Al and electrode 6 includes Pb, $W_{High-z} > W_{Low-z}$, as shown in FIG. 1B, while when electrode 5 includes Cu and electrode 6 includes Pb, $W_{High-z} < W_{Low-z}$. In this example, the net high energy current 8 is in the reverse direction relative to the incident radiation and it is higher at the internal surface of conductor 6 than at the internal surface of conductor 5. The cumulative difference in the changing HEC is converted to charge carriers 3 in the separator 7. The absorbed dose 9 is greater in the high-Z conductor 6 than in the low-Z conductor 5.

As appreciated from the above, detector 100 may be configured to operate solely on measurement of electric current obtained from HEC, or measurement of current from slow charges generated by the contact potential provided by a difference in the work functions between the first layer 102 and the second 104, as well as a combination thereof. In this regard, the detector 100 is self-powered in that it does not require external sources of power to generate electric signals indicative of the incident radiation.

Figures 2A, 2B:
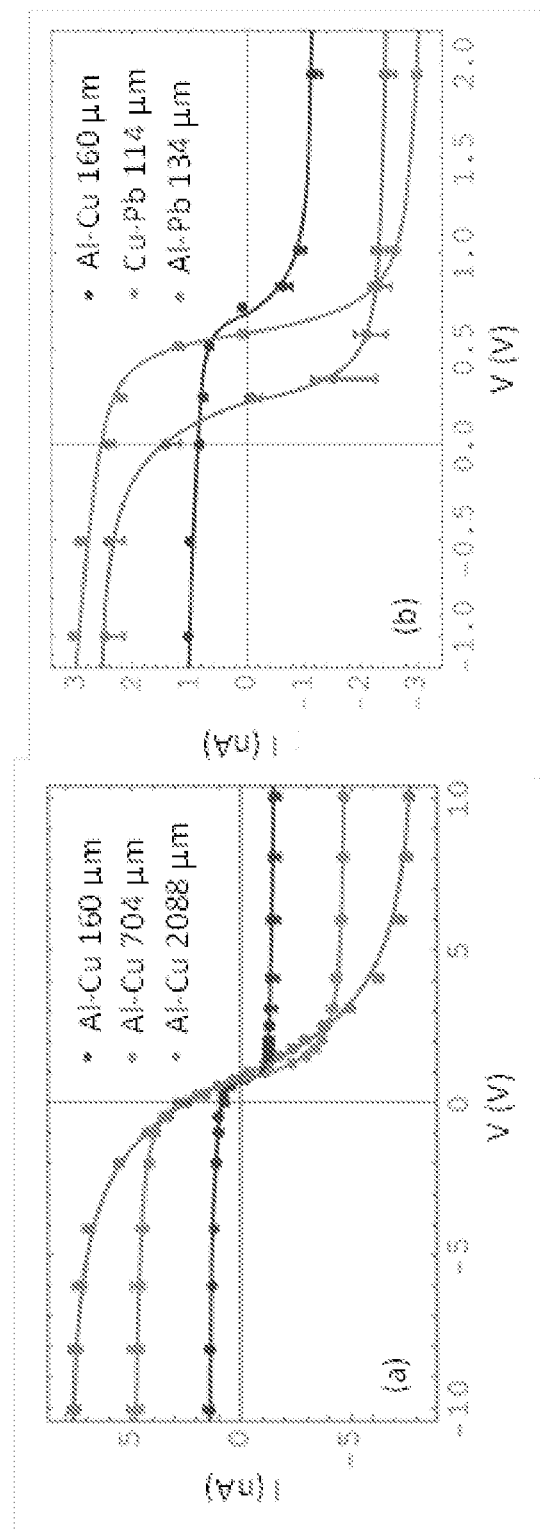
FIG. 2A is a graphical example showing measured current voltage characteristics of an ionizing radiation detector as shown in FIG. 1A wherein the separating layer is air.
FIG. 2B is another graphical example showing measured current voltage characteristics of an ionizing radiation detector as shown in FIG. 1A.

By way of example, FIGS. 2A and 2B show the results from detectors, in accordance to those described with reference to FIG. 1B, subjected to 120 kVp x-rays. Specifically, the current versus voltage characteristics for detectors having three different air gaps, namely 160 μm, 704 μm and 2088 μm, are shown in FIG. 2A. The detectors included Al and Cu for electrodes 5 and 6, respectively. The data was acquired using an externally applied bias voltage between with values −10V to 10V. Similarly, FIG. 2B shows the current versus voltage characteristics for detectors of similar air gap but including Al—Cu, Cu—Pb, and Al—Pb electrode combinations. As appreciated from FIGS. 2A and 2B, at zero bias voltage, there are non-zero current values for each of the measured detectors, indicating that such devices are self-powered.

Figure 3B:
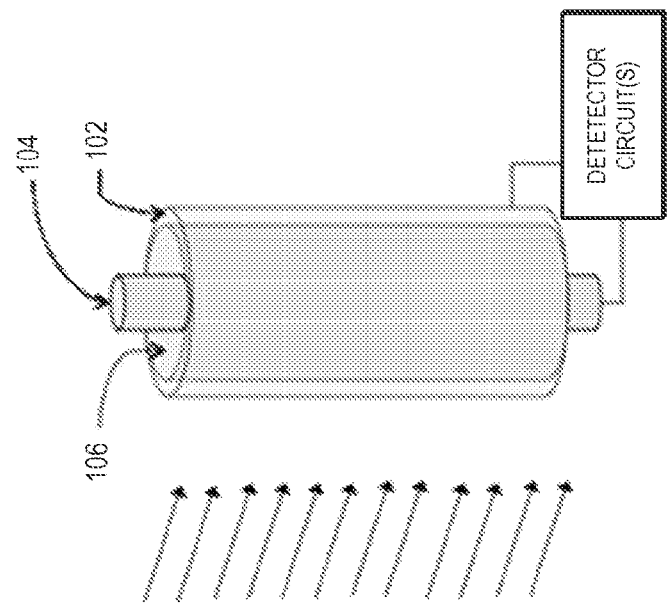
FIG. 3B an illustration of an example ionizing radiation detector having a cylindrical shape, in accordance with aspects of the present disclosure.
Figure 3A:
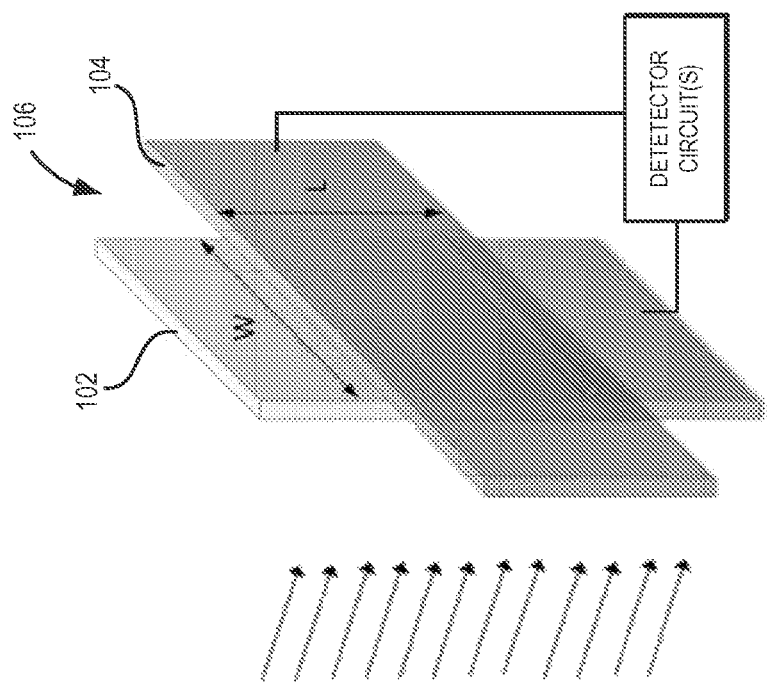
FIG. 3A an illustration of an example ionizing radiation detector having overlapping parallel-strip electrodes, in accordance with aspects of the present disclosure.

The detector 100 described with reference to FIGS. 1A and 1B illustrate a non-limiting parallel plate geometry. However, it may be appreciated that any shapes, geometries, dimensions, aspect ratios, and configurations may implement principles outlined in the present disclosure. In particular, the shape of at least one portion of detectors, in accordance with the various embodiments of the present disclosure, may include a curvilinear shape, a cylindrical shape, a spherical shape, a triangular shape, a rectangular shape, a parallelogram shape, a planar shape, so forth, or an arbitrary shape, for example, as shown in FIGS. 3A and 3B. In addition, such detectors can include finned or combed structures with and without additional structures embedded therein. In some aspects, detectors can possess an irregular, non-contiguous shape, and can include smooth, rough or structured surfaces, as well as embedded nanomaterials, including nano-films, nanocrystals, quantum wires, nano-structures, nanofibers, rough nano-surface, micro-films, micro-crystals, micro-wires, microstructures, microfibers, rough micro-surface or a combination thereof. In addition, detectors may be fashioned upon or be configured to conform to any surface desirable.

Figure 4A:
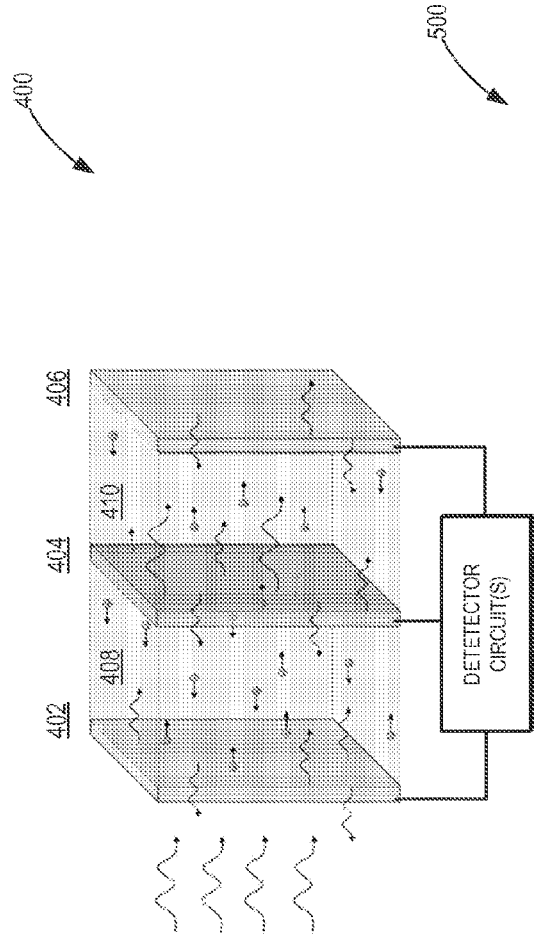
FIG. 4A is a perspective view of a variation on the example ionizing radiation detector of FIG. 1A having three electrodes, in accordance with aspects of the present disclosure.

Turning to FIG. 4A, a schematic diagram of another example ionizing radiation detector 400, in accordance with aspects of the present disclosure, is shown. The detector 100 includes a first layer 402, a second layer 404, and a third layer 406. The detector 400 also includes a first separating layer 408 positioned between the first layer 402 and second layer 404, and a second separating layer 410, positioned between the second layer 404 and the third layer 406. Similar to the detector described with respect to FIG. 1A, materials forming the first layer 402, the second layer 404, and third layer 406, may have conducting or semi-conducting properties, while materials forming the first separating layer 408, the second separating layer 410, may be electrically insulating or non-conductive, and include a dielectric, a semiconductor, a scintillator material, a metamaterial, and so forth, or a vacuum. As shown in the illustration of FIG. 4A, properties of the first layer 402 and the third layer 406, as well as those of the first separating layer 408 and the second separating layer 410, are similar. However, it may be conceived, that materials, thicknesses and other properties may be configured to be different for any, or all of the layers forming the detector 400, as described with regard to FIG. 1A.

By way of example, the qualitative behavior an ionizing radiation detector 400, as described with reference to FIG. 4A, subjected at two different x-ray irradiation energies, are shown in FIGS. 5A and 5B, respectively. The performance is shown in comparison with a commercial ionization chamber (A12, by PTW Inc.). The depth dependence of the normalized signal in a solid water phantom obtained using HEC measures of Al—Cu—Al and Al—Pb—Al structures, as described above, are compared versus the ion chamber for 80 kVp and 120 kVp x-ray energies incident on the water phantom. The detectors were located at different distances downstream inside the solid water phantom in air (depth). The commercial ionization chamber and each HEC detector were irradiated under identical conditions. As demonstrated by FIGS. 5A and 5B, the characteristic behavior of the HEC detector is equivalent to the commercial ion chamber when used as described above.

Figure 4B:
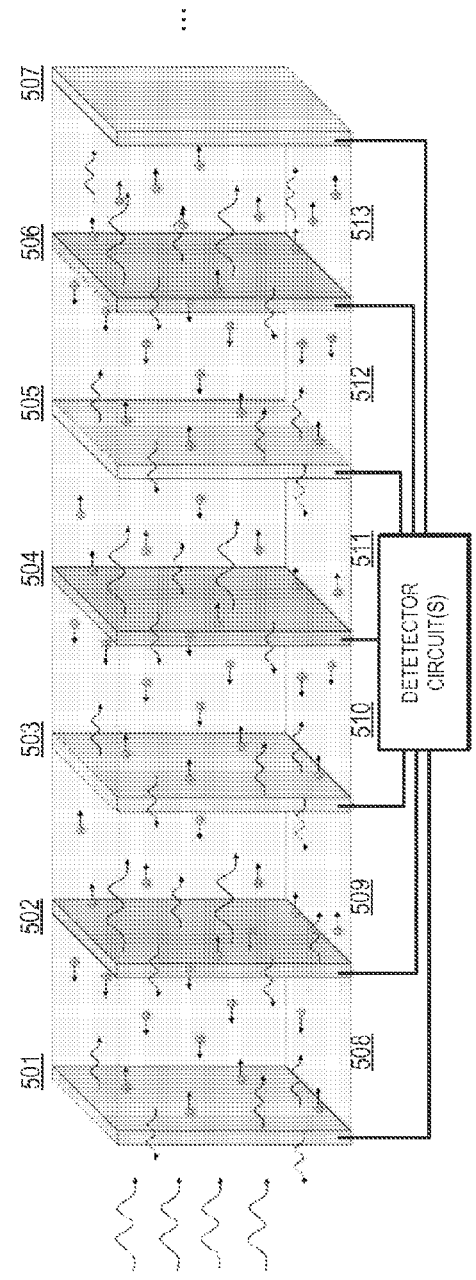
FIG. 4B is a perspective view of another variation on the example ionizing radiation detector of FIG. 1A having multiple electrodes, in accordance with aspects of the present disclosure.

In another example, FIG. 4B shows an extended multi-layer planar structure 500 in which the detector units, consisting of the detector 100 described with respect to FIG. 1A, are repeated. The number of repetitions may be odd or even, and may extend to as many layers as the particular radiation detection application requires. In one embodiment, the repetition may be periodic, such that layers 502, 504, 506, and so forth, include a first material, while layers 503, 505 and 507, and so forth, include a second material, wherein the first and second materials are different. The separating layers 508, 509, 510, 511, 512, and 513 may include the same or different materials. The particular layer thicknesses may also be periodic. In some aspects, properties of the layers forming the multilayer planar structure 500 may be allowed to differ completely, or form a period or quasi-periodic structure. Example structures include Z1-gap-Z2-gap-Z1 . . . , or a Z1-gap1-Z2-gap2-Z3-gap3 . . . , and so forth. As described, layers in such structures may be electrically connected, either in parallel, or series, or combinations thereof, with materials and layer thickness being adapted to the incident particle types and energies associated with such structures.

Figure 4C:
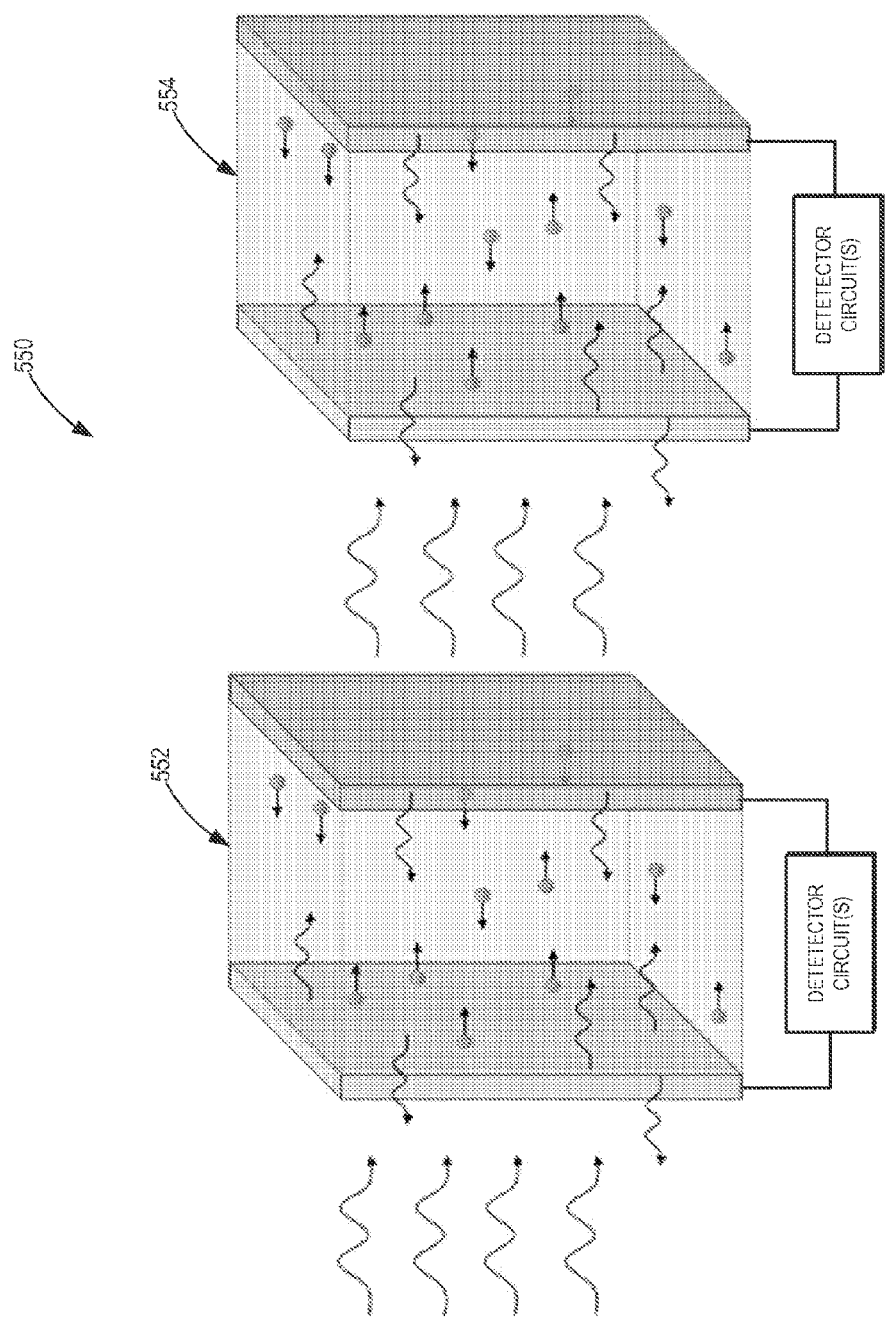
FIG. 4C is a perspective view of another variation on the example ionizing radiation detector of FIG. 1A stacked detector units, in accordance with aspects of the present disclosure.

In another example, FIG. 4C shows an alternative structure 550 to the multilayer planar structure 500 shown in FIG. 4B. Specifically, the structure 550 is formed by stacking two or more individual detectors, as described with reference to FIG. 1A, and shown in FIG. 4C, or as described with reference to FIG. 4A. Alternatively, the structure 500 may be formed by stacking multilayer structures, as described with reference to FIG. 4B. Because optimal layer thicknesses are related the mean free path of the incident particles, the second detector 554 stacked behind the first detector 552 can be reached by the majority of the incident particles and can form its signal independent of that of the first detector 552. In the example in FIG. 4C, electric signal generated may be measured independently respective detector circuits. In alternative configurations, the signals can be combined by electrically connecting the detectors. Indeed various combinations of electric connections may be possible. In some aspects, the materials and respective thicknesses of the layers forming the second detector 554 can be adapted to the quality and energy of the radiation reaching the second detector 554 after traversing the first detector 552.

When the incident radiation consists of x-rays of energy in the range of 30 keV to 150 keV and the detector is used as a transmission detector, the thin film detector structures as described with respect to FIG. 1A and FIG. 4A may be utilized. For instance, the first layer 102 and second layer 104 in FIG. 1A may include similar or different materials, such as Al for the first layer 102 and Cu, or Pb for the second layer 104. Similarly, the first layer 402, second layer 404 and third layer 406 of FIG. 4A may include similar materials. Alternatively, the first layer 402 and third layer 406 may include similar materials, such as Al, while the second layer 404 may include Cu or Pb. Optimally, for transmission detectors, the thickness of the layers, as described above, may be on the order of nanometers, although other values may be possible.

In some applications, such as medical imaging, it may be desired to capture as many incident particles, as possible. In such case the multilayer structure described with reference to FIG. 4B may be adapted to possess as many layers as sufficient to reach the desired beam absorption fraction for the particular medical application, which ranges from 0 to 1. In some aspects, each electrode layer may have a thickness in a range between 1 nm and 100 µm and while each separating layer may have a thickness in a range between 1 nanometer and 1 centimeter, although other values may be possible.

In some aspects, detectors in accordance with the present disclosure, may be transparent to more than 95% of incident ionizing radiation and can provide measurable signals based on less than 5% of absorbed flux. However, if desirable detector structures may be adapted, or configured, for example by increasing the number of thin layers, to increase have absorption of the incident radiation to more than 5%.

Figure 6:
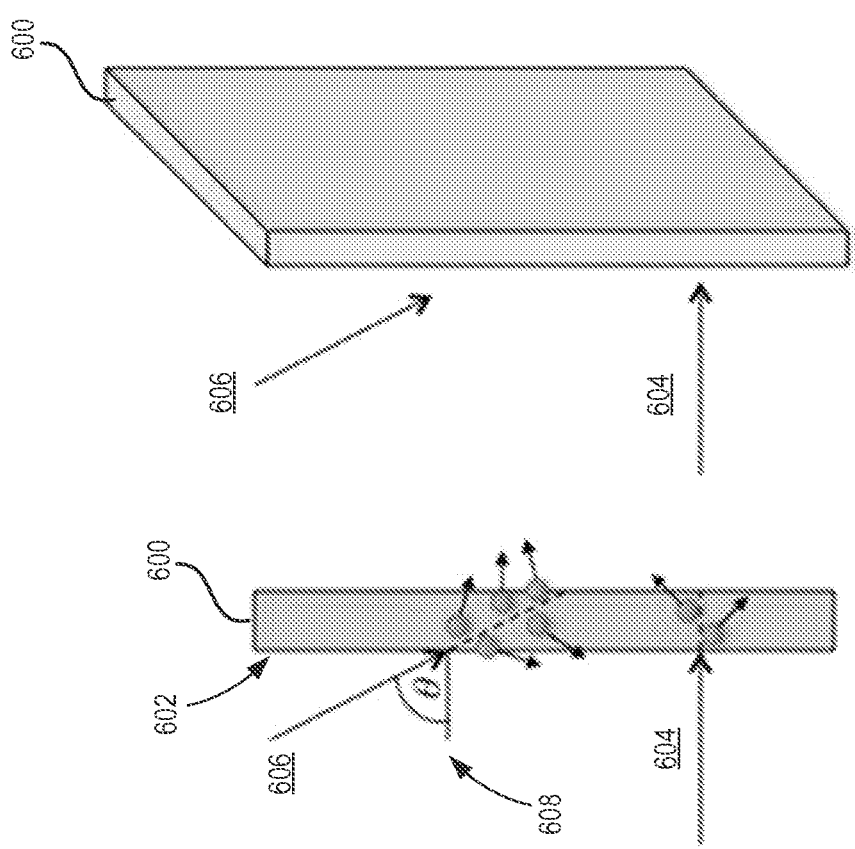
FIG. 6 is an illustration showing secondary particle generation in a layer where ionizing radiation is incident perpendicular to the layer surface or at an angle relative the surface normal.

In some aspects, detector structures, or detector layers, in accordance with the various embodiments shown in FIGS. 1A, 3A, 3B, 4A and 4B, may be configured with a high aspect ratio. That is, at least one lateral dimension of the detector, or layers forming the detector, is much greater than the other one. As such, a response to incident radiation becomes dependent on the angle that the incident radiation makes with the detector, detectors or detector structures. To illustrate this point, a conducting layer 600, as described with reference to FIG. 1A, for example, is shown in FIG. 6 exposed to radiation incident from two different directions relative to a proximal surface 602. The path of a first beam 604, normally incident to the proximal surface 602 of the conducting layer 600, is shorter inside the conducting layer 600 compared to the path a second beam 606 that is incident at an angle θ with respect to the surface normal 608. As a result the first beam 604 generates fewer secondary particles compared to the second beam 606. Because secondary particles are the source of HEC and dose enhancement, as described, detector, such as those detailed with regard to FIGS. 1A and 4A, for instance, would be more sensitive when a radiation beam is incident at an oblique angle rather than normal to the detector surface. As a result, in some aspect, such angular sensitivity may be utilized to determine a location of a source of radiation beam.

Figure 7B:
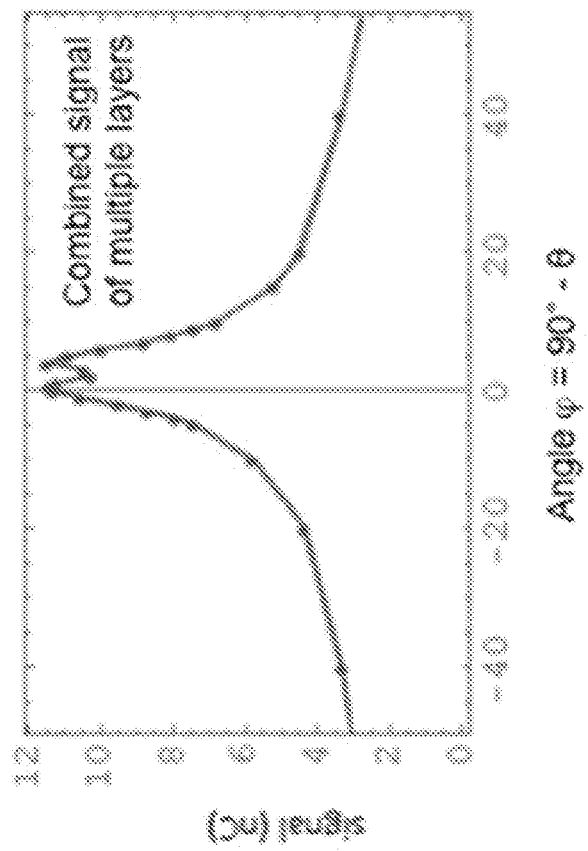
FIG. 7B is a graphical example showing signal as a function of the incident angle of the ionizing radiation beam for the multilayer detector stack of FIG. 7A.
Figure 7A:
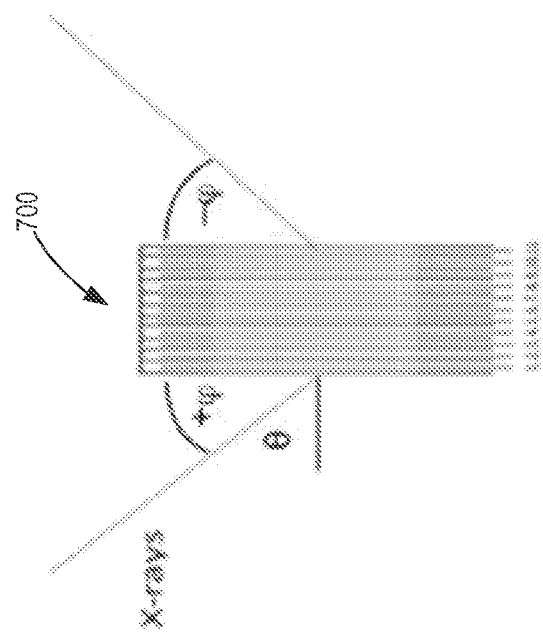
FIG. 7A is a schematic illustration showing a multilayer detector stack subjected to angled ionizing radiation beam, in accordance with aspects of the present disclosure.

As an example, FIG. 7A shows an experimental test arrangement using a multilayer parallel-plane detector 700 subjected to 120 keV an x-ray beams incident at various angles. The angle could be measured in terms of θ that the incident radiation beam makes with the surface normal, as indicated FIG. 7A, or by its complementary $\varphi=90°-\theta$. FIG. 7B shows the measured signal as function of the complementary angle. It may be appreciated that when the incident angle is oblique, that is, nearly parallel to the longer axis of the multilayered device (grazing incidence) the measured signal is a multiple of the signal obtained when the angle of incidence is normal to the plane of the detector, namely $\varphi=90°$.

Figure 8:
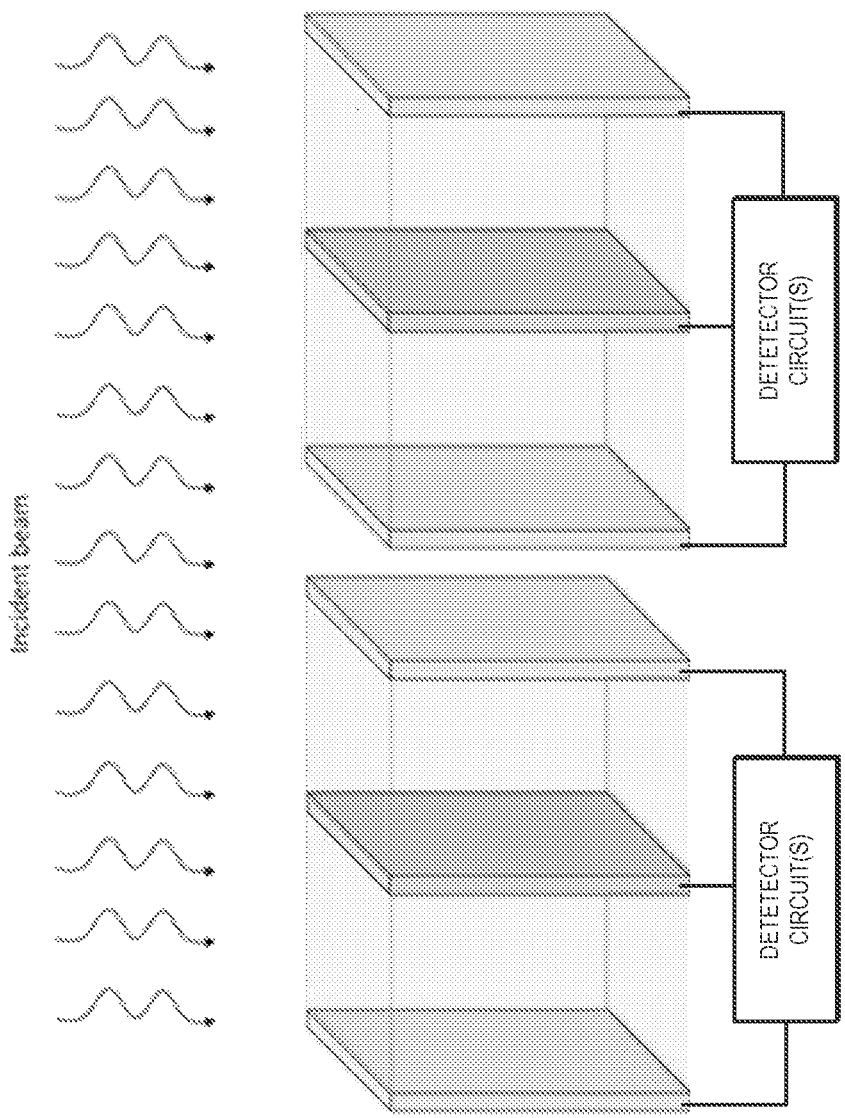
FIG. 8 is a perspective view of an example ionizing radiation detector, in accordance with aspects of the present disclosure, subjected to an ionizing radiation beam at a grazing angle.

In some configurations, radiation may be incident at an oblique angle or grazing incidence to a set having multiple detector structures or elements, as described. Such configuration can provide a high spatial resolution of the incident radiation, wherein spatial resolution is the ability to detect location-wise differences in the radiation field. This is illustrated in FIG. 8, where two similar multilayer detectors, as described with reference to FIG. 4A. are shown oriented relative to a grazing radiation incidence. However, it may be appreciated that more detectors may be utilized. In addition, for the purpose of spatially resolving the incident radiation, the multilayer detectors, or layers configured therein, need not to be identical. In addition, the number of layers, their material composition and thicknesses may be adapted for the particular application. As shown, electric signals generated by each multilayer detector is measured separately by respective detector circuits. Because each multilayer detector is a thin film, generally less than 1 mm, and each can detect the radiation independently from the other one, the spatial resolution in the direction of stacking is limited only by the total thickness of the layers within a single device.

Figure 9A:
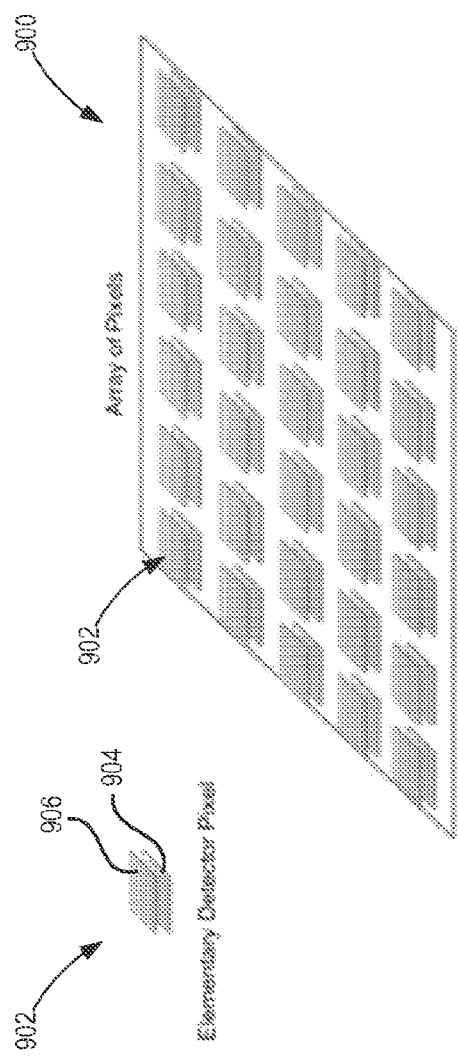
FIG. 9A is a perspective view showing an example pixelated array of detectors, in accordance with aspects of the present disclosure.

In some detector designs, detector embodiments, as described, can be utilized to form a pixelated array. For example, FIG. 9A shows an array 900 of detecting pixels 902, formed using detectors, as described with reference to FIG. 1A. In particular each detecting pixel 902 includes a first pixel layer 904 and a second pixel layer 906, separated by a gap or separating layer, as described. However, it may be appreciated that other detector types can be utilized for the detecting pixels 902, in accordance with the various embodiments provided by the present disclosure. In addition, the array 900 may be oriented at normal or oblique angles relative to the incident radiation, as described.

Figure 9B:
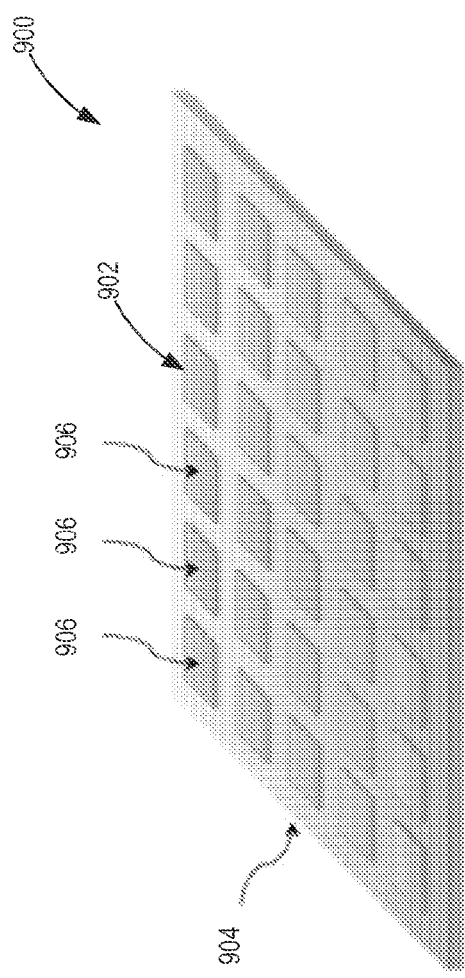
FIG. 9B is a perspective view showing another example pixelated array of detectors, in accordance with aspects of the present disclosure.

A variation of the same concept is shown in FIG. 9B, wherein the first layer 904 forms a contiguous plate while the second layer 906 is individual to each detecting pixel 902. In this configuration, the separating layer between the first pixel layer 904 and a second pixel layer 906 may be a contiguous layer on top of the first layer 904, or may be adapted to the size of the second layer 906. Because the layers in the array 900 of FIG. 9A or FIG. 9B are thin films, each array 900 can be made flexible and may conform to curvilinear surfaces.

In some aspects, the shape of detecting pixels 902 need not be square nor confined to two-dimensional planes, as shown in FIGS. 9A and 9B For instance, pixels may be rectangular, triangular, circular, and so forth, or may have irregular shapes as well. In some aspects, pixels may be in the form elongated strips. Also, pixels forming an array may conform to a curved or irregular surface. In addition, pixel size can range in size from sub-millimeter to centimeters, to feet, and to meters, depending on the desired application. For instance, a pixel size may be less than 1 μm, 1 μm to 100 μm, 100 μm to 1 mm, and 1 mm to 100 mm, 100 mm to 10's of feet. In some aspects, detecting pixel 902 may be positioned such that they do not obscure one another.

FIG. 10 shows additional, but by no means limiting examples. In particular, FIGS. 10A, 10B and 10F and 10G show various arrangements of strip shaped detectors. The high aspect ratio of strip detector acts as a line integral of the radiation incident on the detector. Various geometrical arrangements of such strip detectors permit gathering specific information about the radiation field. For example, strip detectors can be stacked as shown in FIG. 10A with alternating atomic number layers separated by separator. FIG. 10B shows a side-by-side arrangement of strip detectors as one of the conductor layers while the other conductor layer is a contiguous material. Signal may be harvested from each strip in conjunction with the contiguous conductor layer. FIG. 10F shows an arrangement in which there are three conductor layers: the layer on the left has side-by-side strips, similar to FIG. 10B, the conductor layer in the center is a contiguous plate, whereas the conductor layer on the right is composed of strips oriented perpendicularly or in an angle with respect to the strips on the left layer. As in FIG. 10B, signal from the strips can be harvested individually. Such configuration as shown in FIG. 10F can serve to computationally reconstruct a signal as though a detector formed by such structure were pixelated. A more complex strip detector arrangement is seen in FIG. 10G, which is sensitive both spatially and directionally. In this design, the series of strips are mutually perpendicular or angled, and are organized in three-dimensions. This permits the combination of high spatial resolution with directional sensitivity, plus a simulated pixelated software reconstruction. Completely irregular shapes are also possible, as seen in FIG. 10D.

Figure 11:
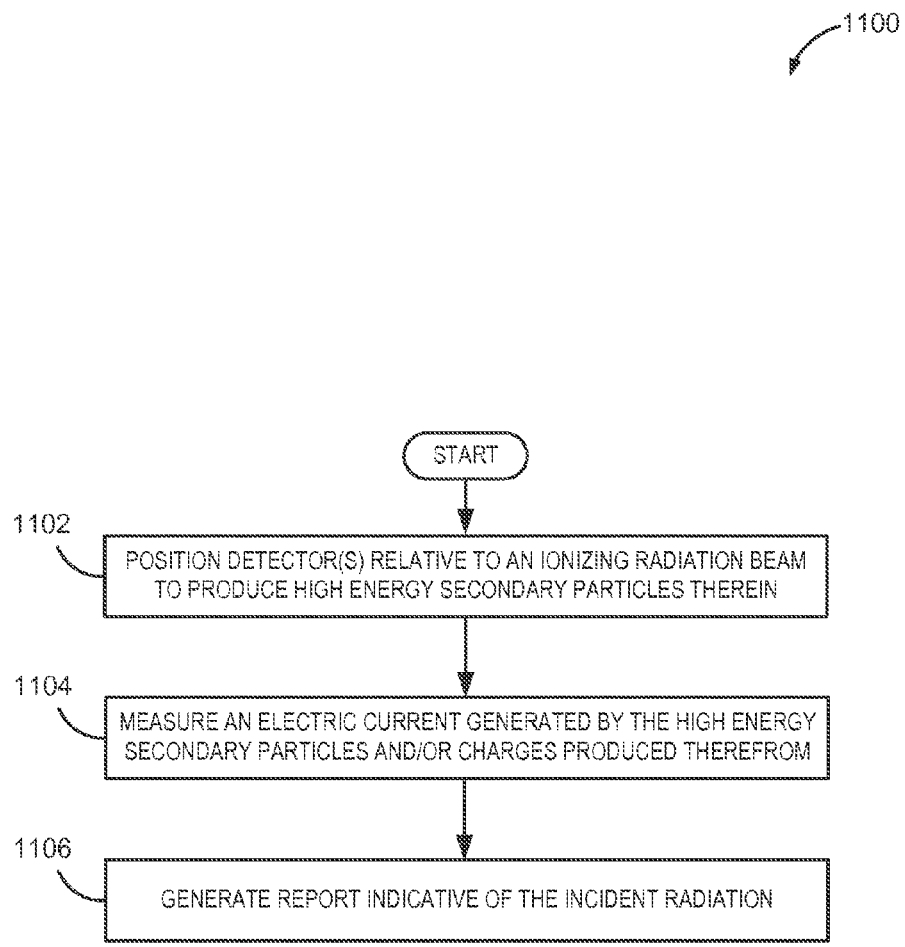
FIG. 11 is a flowchart setting forth steps of a process in accordance with aspects of the present disclosure.

Turning to FIG. 11, a process 1100 in accordance with aspects of the present disclosure is provided. The process 1100 may begin at process block 1102 with positioning one or more detectors relative to an ionizing radiation beam to produce high energy secondary particles therein. Detectors, in accordance with the various embodiments described, can be shaped in nearly arbitrary geometries and can be combined to form a multitude of shapes and sizes, as the particular radiation detection application demands it. In some aspects, ionizing radiation subjected thereupon can be uniform and plane-parallel. In other aspects, the ionizing radiation may be non-uniform or originate in a point source, or may diverge or include heterogeneity in the flux.

At process block 1104 electric currents may be measured between various layers forming the various detectors, as described. In some aspects, an electric current may be measured between at least the first layer and second layer forming a detector, wherein the first layer and the second layer are separated by a separating material, as described with reference to FIG. 1A. In some configurations, at least one of the first layer and the second layer includes a high-Z material. The materials forming the layers can have similar or different work functions. In addition, the separating layer can include a low-Z material or a medium-Z material. The measured current is indicative properties of the ionizing radiation, and can be generated by at least one of charges associated with the high energy particles produced by the incident ionizing radiation, and or charges from the high energy particles. In some aspects, electric currents may be measured in a pulse counting mode or an integrative mode. In particular, measured electric currents may be in the form electric signal pulses with a duration in a range between 1 femtosecond and 100 second.

In some aspects, electric signals detected by the detectors, such as electric currents, or signals derived therefrom, may then be received and analyzed, for instance using an analysis system, to determine properties of the incident radiation including dose, intensity, timing, energy spectrum, count, location, and direction. In other aspects, electric signals detected by the detectors may be utilized to power one or more connected electronic components, circuits, or devices. For instance, this can include, but is not limited to LED, OLED, LCD, phosphor sensors, and other related electric devices. A report, of any form, may then be generated, as indicated by process block 1106.

Figure 12:
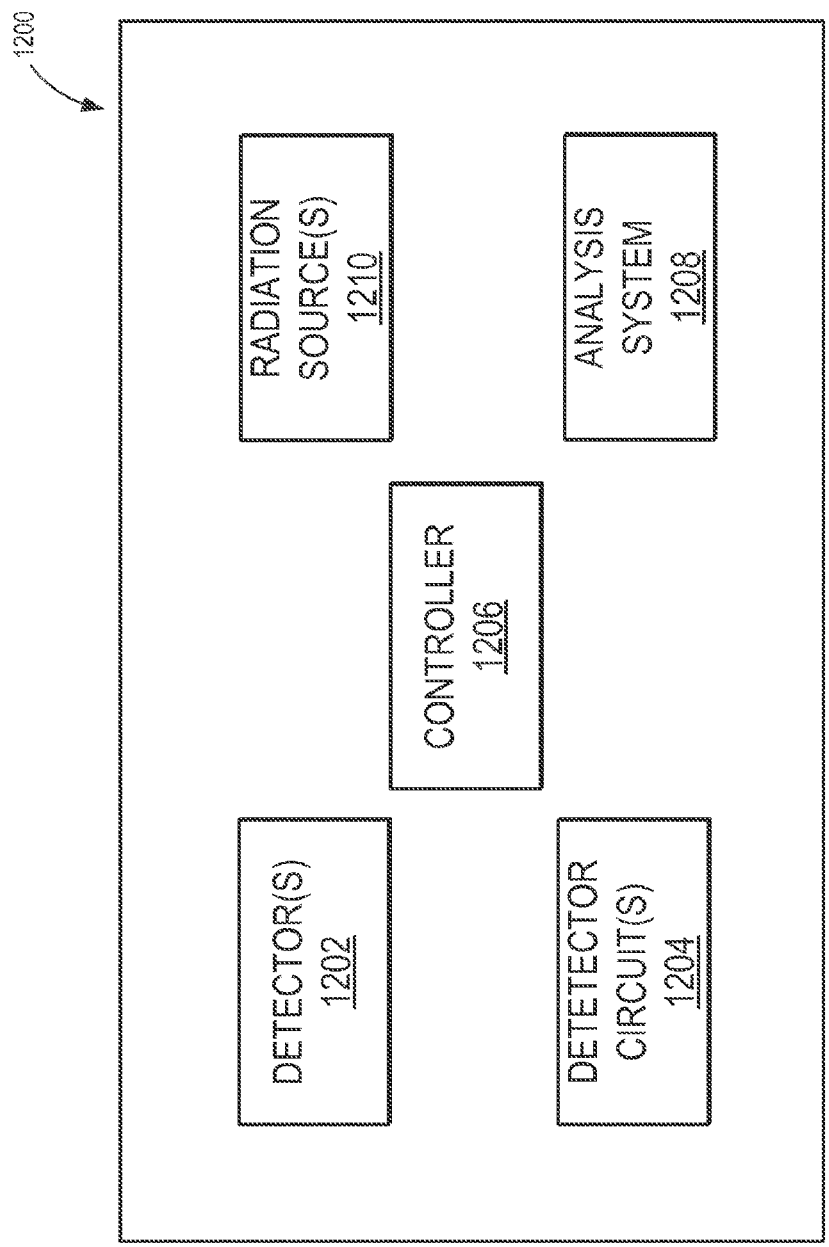
FIG. 12 is an example system in accordance with aspects of the present disclosure.

Turning to FIG. 12, a system 1200 in accordance with aspects of the present disclosure is provided. By way of example, the system 1200 can be a medical imaging system, such as a CT system or fluoroscopy system, a radiation therapy system, a radiation monitoring system, and so forth. As shown in FIG. 12, the system 1200 includes a number of detectors 1202, one or more detector circuits 1204, and a controller 1206. The system 1200 may also include an analysis system 1208, and at least one stationary or movable radiation source 1210.

In some aspects, the detectors 1202 may be formed using a detector structure that includes a first layer comprising a first conducting material, a second layer comprising a second conducting material, and a separating layer positioned between the first layer and second layer, as described, with reference to FIG. 1A, for example. In some preferred embodiments, the detectors 1202 comprise layers having materials including high-Z materials, medium-Z materials and low-Z materials, in any of the configurations described. In some aspects, the detectors 1202 may be assembled to form a stacked structure or a pixelated array. In some configuration, the detectors 1202 of system 1200 can include, or be combined with, conventional radiation detectors, such as scintillator-based detectors, for example.

In some implementations of system 1200, for example, as a medical imaging or radiation therapy system, the detectors 1202 may be arranged to detect ionizing radiation entering or exiting a subject, or both. In addition, the detectors 1202 may be configured to detect scattered ionizing radiation or the presence of ionizing radiation. In some configurations, the detectors 1202, may be configured with a certain level of radiation transparency, such as 90% or more, and may be positioned between the radiation source 1210 and the subject in order to detect and quantify ionizing radiation entering the subject. In addition, the detectors 1202 may be movably positioned in proximity to the radiation source 1210, in proximity to the subject, or anywhere therebetween, as well as at multiple locations about the subject.

As described, the detector circuits 1204 are electrically connected to the various layers and components forming the detectors 1202, and are configured to measure various electric currents generated by the incident radiation between various layers, stacks, pixels, or pixel arrays. In some aspects, electric currents generated are high energy currents and low energy currents, as described. In some configurations, the detector circuits are configured to measure electric signals from the detectors 1202 in a pulse counting mode or an integrative mode. In particular, detector circuits 1204 may include hardware for measuring current, voltage, charge, and so forth. In some aspects, the detector circuits 1204 may be configured to detect signal pulses with a duration in a range between 1 femtosecond and 100 seconds. In addition, the detector circuits 1204 may also include one or more sources for sourcing current voltage, or charge. As described, in some modes of operation, a small external bias voltage may be applied to various layers forming the detectors 1202.

The controller 1206 may be configured to control various processes associated with operation of system 1200. For instance, in the case that the system 1200 is a medical imaging system, the controller 1206 may coordinate the activation of ionizing radiation provided by the radiation source 1210, and measurement of currents generated in the detectors 1202 using the detector circuits 1204. The controller 1206 may also control a positioning of the radiation source 1210 and detectors 1202, as well as a positioning of an imaging subject.

In some aspects, the controller 1206 may process the electric currents measured by the detector circuits 1204, and relay data to the analysis system 1208 for further processing or analysis. Among other configurations, the analysis system 1208 may be configured to determine various properties of the incident radiation, including dose, intensity, timing, energy spectrum, count, location, and direction, using the received data. For example, in the case that the system 1200 is a medical imaging system, or a radiation therapy system, the analysis system 1208 may be configured to quantify, either intermittently or in real-time, a dose, or a rate of ionizing radiation accumulated by a subject. In some aspects, the analysis system 1208 may then generate a report indicative of the measured and quantified radiation.

Figures 13A, 13B:
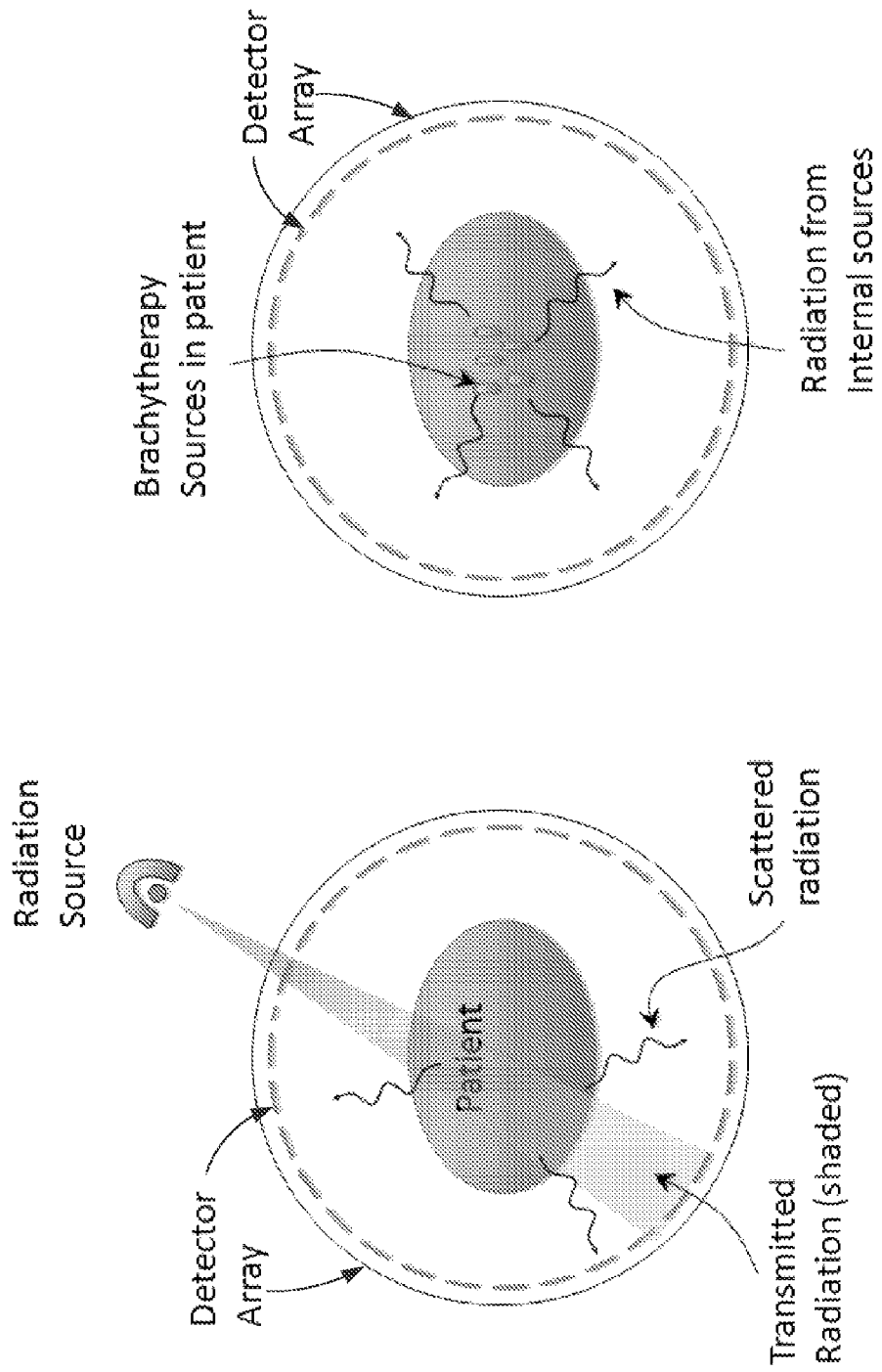
FIG. 13A is an illustration of an example imaging and/or treatment system, in accordance with aspects of the present disclosure.
FIG. 13B is an illustration of another example imaging and/or treatment system, in accordance with aspects of the present disclosure.

By way of example, FIGS. 13A and 13B show example systems implementing real-time dosimetry and/or imaging for use in medical imaging or radiation therapy, and other applications. For example, the system shown in FIGS. 13A and/or 13B may be a CT system, a fluoroscopy system, or similar imaging system, as well as a radiotherapy system, and so forth. Referring specifically to FIG. 13A, a beam generated by an external radiation source is shown incident on the patient's body. A portion of the incident beam energy is deposited in the patient, a portion is transmitted without interaction, and yet another portion exits the patient after scattering. Thin-film detector arrays, in accordance with the present disclosure, may be positioned to detect any or all such portions of the incident beam. In some configurations, one or more detector arrays can be positioned behind, in front, or sideways about the patient relative to the incident beam. Although FIG. 13A shows detectors arranged in circular fashion about the patient, other configurations may also be possible, for example piecewise planar. The detector array may be part of portal dose monitoring or imaging systems, by which the measured dose distribution and/or patient position can be verified in real-time. For instance, such real-time information can be compared to calculated dosimetric quantities or desired patient positions. In some aspects, patient entrance dose, exit dose, or integral dose, or reconstructed internal dose distribution can be displayed alongside or together with patient anatomical images. In FIG. 13B the thin-film detector array is positioned about a patient receiving brachytherapy treatment, where implanted seeds of radioactive elements produce ionizing radiation from within the patient. Alternatively, radioactive tracers, such as positron-emitting radionuclides may also be utilized. Measurements obtained using the detector array can then allow determination of real-time information, such the radiation source positions, timing, and dosimetric quantities. The thin-film detector arrays and barachytherapy sources are depicted thicker and larger in FIGS. 13A and 13B in order to enhance their visibility.

The present invention has been described in terms of one or more preferred embodiments, and it should be appreciated that many equivalents, alternatives, variations, and modifications, aside from those expressly stated, are possible and within the scope of the invention.

The invention claimed is:

1. A detector for detecting ionizing radiation, the detector comprising;
    a first layer comprising a first conducting material;
    a second layer comprising a second conducting material, wherein at least one of the first layer and second layer is configured to produce secondary particles upon irradiation by an ionizing radiation, a thickness of the first layer or the second layer, or both, being in a range between 1 nanometer and 1 millimeter; and
    a nonconductive separating layer positioned between the first and second layer configured to transport therebetween at least one of charges associated with the secondary particles and charges produced by the secondary particles,
    wherein an electric current generated by the charges, and collected between the first and second layer, is indicative of properties the ionizing radiation, based on a difference in work function between the first conducting material and the second conducting material for transporting charges, produced by at least the secondary particles, across the separating layer results in generation of at least a portion of the electric current,
    the non-conductive properties of the separating layer forming a forward and reverse high energy current defining a net HEC current indicative of the ionizing radiation.

2. The detector of claim 1, wherein the ionizing radiation is selected from a group consisting of x-rays, gamma rays, alpha particles, ultraviolet rays, electrons, positrons, protons, neutrons, heavy atoms, subatomic particles, or combinations thereof.

3. The detector of claim 1, wherein at least one of the first layer and the second layer comprises a high-Z material.

4. The detector of claim 1, wherein the separating layer is a gas, a dielectric, a semiconductor, a scintillator, a metamaterial, or a vacuum, or a foam or a sol, or a gel, and the separating layer comprises a low-Z material or a medium-Z material.

5. The detector of claim 1, wherein the separating layer comprises a plurality of embedded microstructures, nanostructures or sub-nanostructures comprising a high-Z material, wherein a thickness of the separating layer is in a range between 1 nanometer and 1 centimeter, and the plurality of embedded microstructures, nanostructures or sub-nanostructures comprise a scintillator material.

6. The detector of claim 1, wherein at least a portion of the detector is substantially transparent to the ionizing radiation or visible light.

7. The detector of claim 1, wherein the ionizing radiation is incident upon a surface of the first layer or the second layer at an angle relative to a surface normal.

8. The detector of claim 1, wherein the electric current is generated without an external bias voltage being applied between the first layer and the second layer.

9. The detector of claim 1, wherein a shape of at least one portion of the detector is one of a curvilinear shape, a cylindrical shape, a spherical shape, a triangular shape, a rectangular shape, a parallelogram shape, or a planar shape.

10. The detector of claim 1 wherein the separating layer includes an electrically insulative material.

11. A system for detecting ionizing radiation, the system comprising:
    at least one source of ionizing radiation;
    at least one detector comprising:
        a first layer comprising a first conducting material;
        a second layer comprising a second conducting material, wherein at least one of the first layer and second layer are configured to produce a plurality of high energy charged particles upon irradiation by ionizing radiation from the at least one source, a thickness of the first layer or the second layer, or both, being in a range between 1 nanometer and 1 millimeter;
        a separating layer positioned between the first layer and second layer, the non-conductive properties of the separating layer forming a forward and reverse high energy current defining a net HEC current indicative of the ionizing radiation; and
    a detector circuit electrically connected to the at least one detector configured to measure an electric current between the first layer and second layer generated by at least one of the high energy charged particles and charges released in the separating layer by high energy charged particles; wherein a difference in work function between the first conducting material and the second conducting material is for transporting charges, produced by the secondary particles, across the separating layer to generate at least a portion of the electric current.

12. The system of claim 11, wherein the detector circuit is configured to measure electric signals from the at least one detector in a pulse counting mode or an integrative mode, and further configured to detect signal pulses with a duration in a range between 1 femtosecond and 100 seconds.

13. The system of claim 11, wherein the ionizing radiation is incident upon a surface of the at least one detector at an angle relative to a surface normal.

14. The system of claim 11 further comprising an analysis system configured to receive and analyze electric signals detected by the at least one detector to determine properties of the incident radiation including dose, intensity, timing, energy spectrum, count, location, and direction.

15. The system of claim 11, wherein at least a portion of the electric current is generated by applying an external bias between the first layer and the second layer.

16. A method for detecting ionizing radiation, the method comprising:
    positioning at least one detector relative to an ionizing radiation beam, the at least one detector comprising:
        a first layer comprising a first conducting material;
        a second layer comprising a second conducting material, wherein at least one of the first layer and second layer are configured to produce a plurality of high energy particles upon irradiation by an ionizing radiation, a thickness of the first layer or the second layer, or both, being in a range between 1 nanometer and 1 millimeter;

a nonconductive separating layer positioned between the first layer and second layer configured to transport charges therebetween, the non-conductive properties of the separating layer forming a forward and reverse high energy current defining a net HEC current indicative of the ionizing radiation; and measuring an electric current between the first layer and second layer, wherein the electric current is indicative of properties of the ionizing radiation and is generated by at least one of charges associated with the high energy particles and charges produced by the high energy particles, a difference in work function between the first conducting material and the second conducting material for transporting charges, produced by the secondary particles, across the separating layer to generate at least a portion of the electric current.

17. The method of claim 16, wherein the separating layer comprises a low-Z material or a medium-Z material.

18. The method of claim 16, the method further comprises measuring electric signal pulses with a duration in a range between 1 femtosecond and 100 seconds.

19. The method of claim 16, the method further comprising analyzing electric signals detected by the at least one detector to determine properties of the incident radiation including dose, intensity, timing, energy spectrum, count, location, and direction.

20. The method of claim 16, wherein at least a portion of the electric current is generated by applying an external bias between the first layer and the second layer.

21. The method of claim 16, wherein the plurality of high energy particles includes high energy charged particles, the charges produced by the high energy particles are charged particles or charge carriers or a combination thereof generated inside the separating layer.

* * * * *